Figure 1:
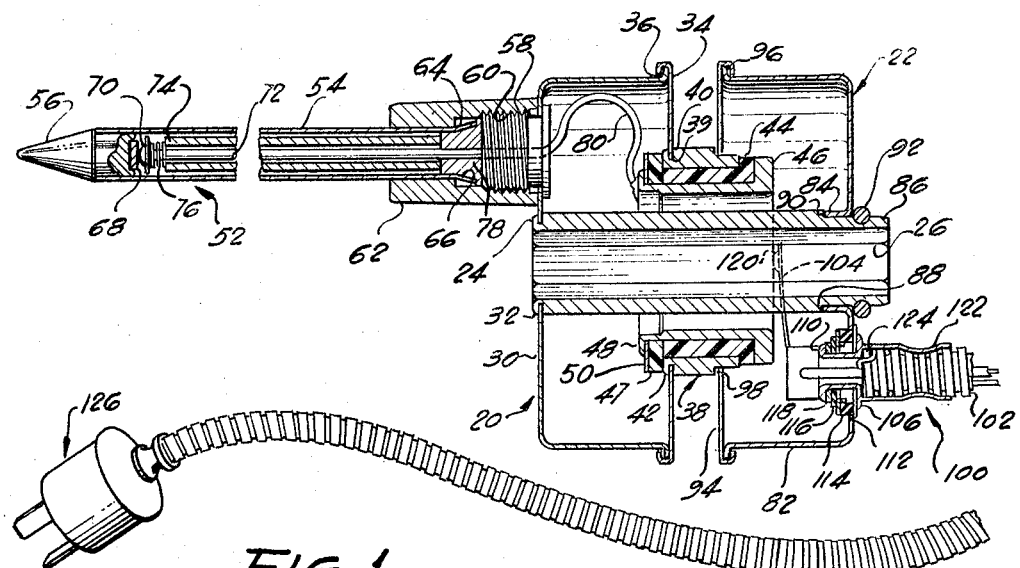

Aug. 23, 1966  R. F. WHARTON  3,267,731
OVEN HEAT SENSOR
Filed Nov. 26, 1963

INVENTOR
Richard F. Wharton.

By William J. Newman
Attorney

3,267,731
OVEN HEAT SENSOR
Richard F. Wharton, Chicago, Ill., assignor to Stewart-Warner Corporation, Chicago, Ill., a corporation of Virginia
Filed Nov. 26, 1963, Ser. No. 325,852
6 Claims. (Cl. 73—351)

This invention relates to temperature sensing probes for electrically indicating meat thermometers. More particularly, this invention relates to temperature sensing probes for electrically indicating heat thermometers which can be used with rotisseries whereby the meat is cooked while secured on a rotating spit.

Many of the modern stoves in production today provide arrangement to easily determine the internal temperature of meats being cooked in the oven compartment. These usually comprise some sort of temperature detecting probe which is insertable in the meat with a conduit line and a plug insertable into a socket in the wall of the oven. Circuit means are provided in the stove for electrically connecting the socket to a temperature indicating meter and/or an alarm device.

Recently, stove manufacturers have been providing power driven rotisserie spits with some of their models on which the meat may be mounted for rotation while being cooked in the oven or broiler. It is desirable that means be provided in such models to monitor the internal temperature of the meat mounted on the spit. The ordinary electrically operated meat temperature sensing units previously mentioned are not adequate for the purpose, of course, because the conduit line would become hopelessely tangled about the rotating spit.

Some attempts have been made to incorporate the temperature detecting probe in the rotisserie spit itself. This arrangement, however, is not the most desirable because it requires a specially adapted spit and mounting means therefor. It is also undesirable because it is not conveniently usable as a thermometer probe when the meat is not to be cooked while rotating. It would be awkward and inconvenient to insert a long spit through a piece of meat and center the temperature sensing element therein when the meat is not to be rotated during cooking. Also, accurate temperature readings are difficult with this type in view of the amount of metal required in the spit to support the meat. The heavy metal spit concentrates the heat therein to give an improper reading of meat temperature.

It is, therefore, an object of this invention to provide a probe for accurately detecting the internal temperature of meat or the like which is usable while cooking on a rotating rotisserie spit.

It is also an object of this invention to provide a probe for accurately detecting the internal temperature of meat on a rotating rotisserie spit which requires no modifications to the spit or the mounting therefor.

A further object of this invention is to provide a temperature detecting probe which may also be conveniently used with meats or the like which are not mounted on a rotisserie spit.

Another object of this invention is to provide a temperature detecting probe which is of simple, economical and maintenance free construction.

Figure 2:
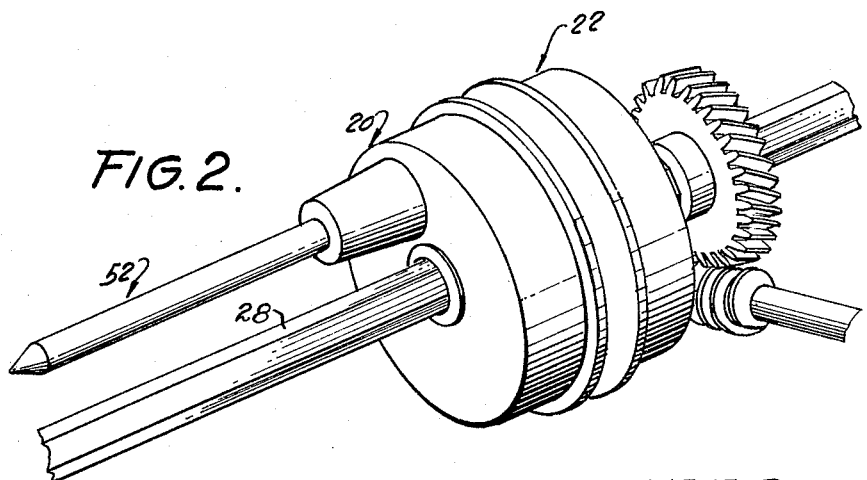

Other objects and advantages of this invention will become readily apparent upon a further reading of this specification especially when taken in view of the accompanying drawings in which:

FIG. 1 is a section view of an oven heat sensor embodying the teachings of this invention; and FIG. 2 is an isometric view of the heat sensor shown in FIG. 1.

In general, this invention includes a heat sensing probe which is insertable into the meat and suported by a member which is mountable on the spit for rotation therewith. A second member is carried by the first member which is rotatable with respect thereto about the axis of the rotating spit. Means are also provided for maintaining electrical continuity from the temperature sensing element in the probe through said first member to said second member which has connecting means to means for indicating the detected meat temperature.

Referring now to the drawings, the preferred embodiment of the temperature sensing probe unit comprises a probe assembly 20 and a connector assembly 22 which is rotatably mounted on the probe assembly. The probe assembly comprises a sleeve 24 having through-bore 26 to receive a rotisserie spit 28 having a similar cross-section. The through-bore 26 is sized so that the sleeve 24 will rotate with the spit 28 but the tolerances are maintained large for ready insertion of the spit therethrough.

A substantially cup-shaped casing 30 is securely mounted at one end of the sleeve 24 for rotation therewith. The end of the sleeve 24 extends through an aperture centrally located in the casing 30 and is rolled over as at 32 in assembly. An annular plate cover 34 is secured to a flange 36 on the casing 30 such as by press rolling and supports an annular contact assembly 38 within its aperture 39.

The contact assembly comprises a shouldered annulus 40 having one end 42 rolled over to securely engage the plate cover 34. An insulating spacer 44 is disposed between the annulus 40 and a flanged annular contact member 46. A heat resistant rubber gasket 47 abuts the one end of the insulating spacer 44 and the annulus 40 and the whole assembly is secured by the rolled over end 48 of the annular contact member 46 engaging a metal washer 50 which abuts the rubber washer 47. As will be noted, the sleeve 24 attached to the bottom of the casing 30 extends through the opening of the annular contact 46, the protruding end thereof serving as a bearing mounting for the connector assembly as will be hereinafter described.

A probe unit 52 extends from an off-center position on the bottom of the cup-shaped casing 30 and comprises a tube 54 which is sealed at its end by a metal point 56. The probe unit 52 is secured to the casing 30 by means of a threaded plug 58 which is engaged by internal threads 60 of a handle 62 having an internal flange 64 in engagement with the diverging end 66 of the tube 54.

Within the probe unit 52 is a thermistor 68 in abutment with the metal tip 56 thereby providing continuity therefrom to the casing of the assembly which serves as electrical ground. A contact 70 in the form of a headed pin has its shank 72 disposed within a tubular spacer 74 to prevent engagement of the contact 70 with the grounded tube 54. A spring 76 surrounds the shank of the contact 70 to urge it into electrical contact with the thermistor 68, a plug 78 preventing axial movement of the tubular spacer 74 in the other direction. A lead wire 80 is soldered to the end of the shank 72 of the contact 70 and extends through the tubular spacer 74, plugs 78 and 58 to terminate in a soldered connection to the rolled end 48 of the annular contact 46. It may, therefore, be seen that electrical continuity exists between the contactor 46 and the thermistor 68.

The connector assembly 22 comprises a cup-shaped casing 82 having a central, inwardly facing annular flange 84 which serves as a bearing surface for rotatably receiving the necked down end 86 of the sleeve 24. The inwardly facing edge 88 on the annular flange 84 abuts the shoulder 90 on the sleeve 24 and is held thereagainst by means of a retainer ring 92 forced into the annular groove adjacent the end of the sleeve 24. An annular cover plate 94 is secured at its periphery to the flange 96 about the periphery of the open end of the cup-shaped casing 82 such as by press rolling. The casing 82 has an axial length such that when it is mounted on the sleeve 24 the annular cover 94 approaches but does not quite engage the shoulder 98 on the shouldered annulus 40 of the contactor assembly 38. Thus, the connector assembly 22 is mounted on the sleeve 24 of the probe assembly for rotation about the axis of the spit 28 insertable through the bore 26 of the sleeve 24.

A coupling 100 for an electric conduit 102 also provides the mounting means for a spring contact 104 within the casing 82. The coupling 100 has a flanged portion 106 which abuts the bottom of the casing and sleeve portion 110 which extends through an aperture in the casing 82 at the center of the stamped portion. An insulating spacer 112 surrounds the sleeve portion 110. The spring contact 104 has a flat annular portion 114 which abuts the spacer 112 and another insulating washer 116 abutting the other side of the flat annular portion of the spring contact 104 which in turn is abutted by a metal washer, all of which are securely maintained in tight assembly by the rolled over end of the conduit connector sleeve portion 110.

The spring contact 104 is particularly shaped and oriented so that its sprung end 120 is in biased engagement with the end of the flanged annular contact 46 of the probe assembly.

The conduit 102 is received in an exteriorly extending sleeve portion 122 and is held therein by any convenient manner such as by swedging as shown. The ground wire 124 is wound about the conduit within the sleeve portion 122 to provide good ground continuity between the conduit and the probe and connector assemblies.

The conduit 102 may terminate at its other end in a plug 126 which is insertable in a socket in the wall of an appropriately adapted stove oven having an electric meter and/or alarm for indicating the internal temperature of meat into which the probe unit of the assembly is inserted.

While there has been described heretofore a preferred embodiment of a meat temperature sensing probe for use with a rotisserie split, it is to be understood that many modifications and improvements may be made thereto while retaining the teachings of this disclosure. It is, therefore, intended that the scope of this invention be limited only by the framework of the appending claims.

What is claimed is:

1. An electric meat thermometer for use with a rotisserie spit comprising a sleeve having a through-bore to removably receive said spit for rotation therewith, a cup-shaped casing concentrically fixed to one end of said sleeve, a sharp projection extending from the bottom end of said casing and adapted to be inserted into the meat on the spit, a thermistor within said projection, an annular cover plate fixed about its periphery to the open end of said casing, a substantially tubular contact bearing rigidly carried by said cover plate externally of said casing and concentric about the axis of said spit means, means electrically connecting said thermistor to said contact bearing, a second cup-shaped casing having a cylindrical bearing surface centrally disposed in the bottom end thereof matably receiving the other end of said sleeve for rotation of the casing with respect to said sleeve, a second annular cover plate fixed about its periphery to the open end of said second casing, said second cover plate surrounding but not engaging said tubular contact bearing, contact means rigidly supported by and insulated from said second casing slideably engaging said contact bearing, and connector means for connecting said contact means and contact bearing to an electrical meter for indicating the internal temperature of the meat on the probe.

2. An electric meat thermometer probe unit for use with a rotisserie spit comprising a sleeve having a through-bore to removably receive said spit for rotation therewith, a cup-shaped casing concentrically fixed to one end of said sleeve, a sharp projection extending from the bottom end of said casing and adapted to be inserted into the meat on the spit, a thermistor within said projection, an annular cover plate fixed about its periphery to the open end of said casing, a substantially tubular contact bearing rigidly carried by said cover externally of said casing and concentric about the axis of said spit means electrically connecting said thermistor to said contact bearing, a second cup-shaped casing having a cylindrical bearing surface centrally disposed in the bottom end thereof matably receiving the other end of said sleeve for rotation of the casing with respect to said sleeve, a second annular cover plate fixed about its periphery to the open end of said second casing, said second cover plate surrounding but not engaging said tubular contact bearing, and contact means rigidly supported by and insulated from said second casing slideably engaging said contact bearing.

3. An electric meat thermometer for use with a rotisserie spit supporting meat for rotation about one axis, the improvement comprising a first member having an exterior metal casing with a metal projection thereon and electrically connected thereto for insertion into said meat and rotation therewith at a position spaced from said axis, a thermal sensor having a pair of terminals and carried by said projection in said meat for sensing the temperature of said meat with one of said terminals engaged with said projection and the other terminal insulated from said projection, a second member stationary relative said axis and having an exterior metal wall, means electrically interconnecting said metal casing with said metal wall during rotation of said projection, an electrical connector carried by said second member with said connector having a last terminal insulated from said wall, a pair of leads separately connected to said wall and to said last terminal, and slip ring means electrically insulated from both said metal wall and said projection and interconnecting said last terminal and said other sensor terminal.

4. A combination for use with a rotisserie spit of the type including a support member carrying meat for rotation about one axis, the improvement comprising means having an exterior metal surface for insertion partially into said meat at a point spaced from said axis and rotatable with said meat about said axis, a two terminal thermal sensor carried by said means with one terminal electrically connected to said metal surface and the second terminal insulated therefrom, a metal shell member stationary with respect to said axis and electrically interconnected with said metal surface to form an electrical connection between said one sensor terminal and said shell member, a last electrical terminal carried by said shell member internally of said shell member in a stationary position and insulated therefrom, and slip ring means electrically insulated from said shell member and said metal surface and electrically interconnecting said last terminal and said second sensor terminal for enabling both terminals of said thermal sensor to be connected electrically to a remote indicating device.

5. In the combination claimed in claim 4, a sleeve on said support member with said sleeve being rotatable relative said shell member and carrying both said shell member and said exterior metal surface means in positions spaced axially along said axis.

6. A combination for use with a rotisserie spit of the type including a support member carrying meat for rotation about one axis, the improvement comprising a sleeve engaged with said support member and rotatable therewith, metal probe means carried by said sleeve for rotation therewith and for insertion partially into said meat, a two terminal thermal sensor carried by said metal probe means with one terminal electrically connected to said metal probe means and the second terminal insulated therefrom, a metal shell member carried by said sleeve axially spaced from said metal probe means with said sleeve being rotatable relative said shell member so that said shell member is stationary with respect to said axis, a last electrical terminal carried by said shell member in a stationary position and insulated therefrom, a contact member electrically insulated from said metal probe means and sleeve and carried by said metal probe means for rotation therewith, means connecting said contact member electrically to said second sensor terminal and to said last terminal, means electrically interconnecting said metal probe means and said shell member, and a receptacle carried by said shell member for facilely enabling said last terminal and said shell member to be electrically connected to a remote indicating device.

References Cited by the Examiner

UNITED STATES PATENTS

| | | | |
|---|---|---|---|
| 2,431,473 | 11/1947 | Flynn | 73—351 X |
| 2,787,948 | 4/1957 | Mathis | 73—352 X |

FOREIGN PATENTS

| | | |
|---|---|---|
| 624,039 | 7/1961 | Canada. |

LOUIS R. PRINCE, *Primary Examiner.*

D. McGIEHAN, *Assistant Examiner.*